US006172183B1

United States Patent
Leino

(10) Patent No.: US 6,172,183 B1
(45) Date of Patent: Jan. 9, 2001

(54) PROCESS AND APPARATUS FOR THE CLEANING OF CRUDE TALL OIL SOAP

(75) Inventor: Hannu Juhani Leino, Espoo (FI)

(73) Assignee: AGA Aktiebolag, Lidingo (SE)

(*) Notice: Under 35 U.S.C. 154(b), the term of this patent shall be extended for 0 days.

(21) Appl. No.: 09/331,961

(22) PCT Filed: Dec. 29, 1997

(86) PCT No.: PCT/FI97/00832

§ 371 Date: Oct. 21, 1999

§ 102(e) Date: Oct. 21, 1999

(87) PCT Pub. No.: WO98/29524

PCT Pub. Date: Jul. 9, 1998

(30) Foreign Application Priority Data

Dec. 30, 1996 (FI) .......................................... 965246

(51) Int. Cl.[7] .................................................. C08F 1/04
(52) U.S. Cl. .......................... 530/209; 530/205; 530/208; 530/230; 526/62
(58) Field of Search ................................. 530/205, 208, 530/209, 230; 526/62

(56) References Cited

U.S. PATENT DOCUMENTS

| 3,901,869 | * | 8/1975 | Bills . | |
|---|---|---|---|---|
| 4,075,188 | * | 2/1978 | Vardell, Jr. . | |
| 4,126,604 | * | 11/1978 | Alford et al. . | |
| 4,256,628 | * | 3/1981 | Tate . | |
| 4,495,095 | * | 1/1985 | Lawson et al. . | |
| 5,164,480 | * | 11/1992 | Huibers et al. | 530/230 |
| 5,286,845 | * | 2/1994 | Huibers et al. | 530/208 |
| 5,455,328 | * | 10/1995 | Vourikari et al. | 530/230 |
| 5,891,990 | * | 4/1999 | Varila et al. | 530/208 |
| 5,898,065 | * | 4/1999 | Altta et al. | 530/205 |
| 6,004,360 | * | 12/1999 | Anderson | 44/306 |

FOREIGN PATENT DOCUMENTS

WO 95/23837   9/1995  (WO) .

OTHER PUBLICATIONS

Uloth, V.C. et al., "Crude spent sulphite liquor as soad acidulation additives to improve efficiency of tall oil production.", Pulp & Paper, vol. 85, No. 5, pp. 69–71 (1984).

* cited by examiner

Primary Examiner—Samuel A. Acquah
(74) Attorney, Agent, or Firm—Browdy and Neimark

(57) ABSTRACT

The present invention relates to a process and apparatus for the cleaning of crude tall oil soap. Crude soap floating on top of a layer of black liquor is cleaned with carbon dioxide, in a tall oil recovery system containing a cleaning vessel (T) for crude tall oil soap and black liquor. Said vessel has a carbon dioxide inlet (6) for introducing cleaning carbon dioxide into the soap. The cleaning vessel (T) is also provided with a black liquor separately from the cleaned soap. The cleaned soap may be acidified so as to provide tall oil.

23 Claims, 2 Drawing Sheets

PROCESS AND APPARATUS FOR THE CLEANING OF CRUDE TALL OIL SOAP

CROSS REFERENCE TO RELATED APPLICATION

The present application is the national stage under 35 U.S.C. 371 of PCT/FI97/00382, filed Dec. 29, 1997.

The present invention relates to a process and apparatus for the cleaning of crude tall oil soap. According to the invention, the crude soap is cleaned prior to a final separation of crude soap and black liquor. After separation of the cleaned crude soap from the black liquor, the soap may be treated in a conventional manner to free the tall oil.

Tall oil is composed mainly of resin acids and fatty acids. Tall oil is recovered from black liquor which is formed primarily in the kraft pulping process. In the pulping process the digesting liquors are removed from the fibers and washed with water. Black liquor is removed at the early stages of the washing, Most of the tall oil is removed as soap with the black liquor and it gradually rises to the surface of the black liquor in the form of crude tall oil soaps. In order to improve the recovery of the crude soap, the liquor may be subjected to evaporation to increase its solids content. The crude soap is skimmed in one or several stages from the main portion of the black liquor. The skimmed crude soap is traditionally acidified with sulfuric acid, separated from the aqueous phase and fractionated to provide desired end products.

The acidification of tall oil soap with sulfuric acid brings additional sulfur into the pulp mill and increases the loading of sulfurous compounds in the mill. Impurities contained in the soap add to the amount of acid needed for proper acidification. Since environmental considerations are making it increasingly unacceptable to discharge sulfurous pollutants into the environment and since tall oil acidification is one of the processes of the pulp mill which include addition of sulfuric compounds, there is a great need in the art for a process providing a reduction of the amount of sulfuric acid required in the treatment of the crude soap and in the production of tall oil.

U.S. Pat. No. 3,901,869 discloses a process for acidifying skimmed crude tall oil soap, wherein a part of the traditional sulfuric acid is replaced by carbon dioxide. The soap is mixed with water, acidified to a pH of about 7 to 8 with carbon dioxide at atmospheric pressure or higher pressures. The reaction mixture is then removed and allowed to settle at ambient pressure, whereafter the soap layer is separated from the sodium bicarbonate brine layer. The soap fraction is then further acidified in the conventional way with sulfuric acid to pH 3 to 4 to provide crude tall oil.

According to WO 95/23837 (Oy Metsä-Botnia Ab et al.) the prior art problem caused by poor separation of water from the soap is solved by neutralizing skimmed crude soap in two stages, first with pressurized carbon dioxide and then with sulfuric acid at ambient pressure to provide a pH close to neutral. The neutralization stage is followed by a water separation stage and a traditional "cook" with sulfuric acid.

U.S. Pat. No. 4,495,095 (Union Camp) describes a process for the acidulation and extraction of skimmed crude tall oil soaps with fluid carbon dioxide in a supercritical state. U.S. Pat. No. 5,286,845 (Union Camp) describes a process for acidulation of skimmed soap with pressurized carbon dioxide. The reaction is allowed to proceed for a few hours with vigorous mixing. The resulting crude tall oil and sodium bicarbonate brine are then allowed to separate, also under pressure. Proper settling of the layers may take up to three days.

Uloth, C. V. et al. in Pulp and Paper Canada 85:5 (1984), p 69–71, report that the separation rate of acidulated tall oil soap in a tall oil recovery system may be accelerated by adding phase separation aids such as lignosulphonates or spent sulfite liquor to the tall oil phase separation stage.

The prior art processes have concentrated on improving the treatment of the crude soap after its final separation from the black liquor, i.e. at a point where no more black liquor will be recovered as black liquor. The prior art processes have especially been directed at decreasing the amount of sulfuric acid needed to acidify the separated crude soap and to improve the separation of the aqueous phase from the acidified soap or tall oil phase. However, none of the above mentioned prior art processes have aimed at improving the separation of the crude soap from black liquor at the stage when the soap is still in contact with the black liquor.

An object of the present invention is to provide an improvement in the production of tall oil.

Another object of the invention is to reduce the amount of sulfurous compounds required in the production of tall oil.

A specific object of the invention is to improve the separation of crude tall oil soap from black liquor in the recovery of tall oil soap.

An object of the invention is also to provide an apparatus for cleaning crude tall oil soap in a tall oil recovery system. The present invention is based on the discovery that crude tall oil soap which is still in contact with significant amounts of black liquor may be cleaned with carbon dioxide. This cleaning process is performed at an earlier stage in the tall oil recovery system than the prior art processes. The soap is cleaned prior to the final separation of black liquor and soap, said final separation being defined as the stage at which the last portions of black liquor are removed from the soap as black liquor. The process according to the invention cleans the crude soap from impurities which otherwise would go with the soap fraction. Hence the cleaning reduces the amount of acid needed to acidify the soap. It also facilitates the separation of soap from black liquor and speeds up the separation process.

The characteristics of the present invention are defined in the appended claims.

Thus, the present invention relates to a process for the cleaning of crude tall oil soap prior to a final separation of said crude soap and black liquor, comprising cleaning crude tall oil soap floating on top of a layer of black liquor or a mixture of crude tall oil soap and black liquor with carbon dioxide, and subsequently discharging the black liquor separately from the soap.

The carbon dioxide cleaning according to the invention is performed prior to, i.e. upstream of any actual neutralization or acidulation of the tall oil soap. The cleaning causes a greater portion of non-tall oil components, i.e. soap impurities to separate from the soap fraction and to move into the black liquor fraction. Said components, will be removed with the black liquor in the subsequent black liquor discharging step.

The carbon dioxide for the cleaning step according to the present invention is preferably in the form of $CO_2$ gas at atmospheric pressure or a higher pressure. According to a preferred embodiment of the present invention, carbon dioxide is provided by feeding a fluid capable of liberating carbon dioxide into said soap or black liquor or said mixture thereof. Such a carbon dioxide liberating fluid may comprise bicarbonate brine or a mixture of bicarbonate brine and soap containing dissolved carbon dioxide.

An embodiment of the invention comprises feeding an aqueous mixture containing an excess of carbon dioxide in a mixture of bicarbonate and tall oil soap into the crude soap layer for liberating carbon dioxide in said soap layer. A suitable source of bicarbonate is sodium bicarbonate brine recirculated from a downstream step of the process. Such a step may comprise a reaction of carbon dioxide with separated cleaned soap.

Said reaction may be a conventional carbon dioxide neutralization or acidulation step subsequent to, i.e. downstream of the cleaning step. In a preferred embodiment of the invention a portion of the cleaned soap, which has been separated from the black liquor, is brought into contact with carbon dioxide and is thereafter recirculated to said cleaning stage as said carbon dioxide liberating fluid. Said fluid preferably contains an excess of carbon dioxide gas which will be liberated into the soap which is to be cleaned. Water and/or a phase separation aid may be added to the reaction mixture.

The present invention also relates to an apparatus suitable for performing the above process in a tall oil recovery system. Such an apparatus for cleaning crude tall oil soap, comprises in said tall oil recovery system at least one cleaning vessel for crude tall oil soap and black liquor which cleaning vessel is provided with an inlet for carbon dioxide and/or a carbon dioxide liberating fluid, said cleaning vessel or at least one vessel downstream thereof being provided with a black liquor outlet.

Said cleaning vessel may comprise any vessel in a tall oil recovery system which usually is prior to, i.e. upstream of any actual neutralization or acidulation vessel of said system. Such vessels are, for instance, black liquor tanks, skimming tanks, black liquor separation tanks, soap storage or retention tanks, and soap washing tanks.

In a preferred embodiment said apparatus includes a reactor for mixing soap and carbon dioxide at atmospheric pressure or a higher pressure, said reactor being provided with a mixer and inlets for soap and carbon dioxide, as well as an outlet for the resulting mixture. The outlet is connected to the carbon dioxide liberating fluid inlet in the cleaning vessel.

The present invention also relates to a process for the production of tall oil, comprising the steps of recovering black liquor and crude tall oil soap in a tall oil recovery system of a pulping process, cleaning said soap by introducing carbon dioxide or a carbon dioxide liberating fluid into said soap or black liquor, separating black liquor from the cleaned soap, acidifying said cleaned soap in one or more stages, and recovering tall oil.

The invention will be described in greater detail with reference to the preferred embodiments thereof, but it is obvious to persons skilled in the art that the invention may be modified in many ways and that the invention is not limited to the specific embodiments shown in the appended drawing, wherein

In the following description the term "cleaning carbon dioxide" should be understood to encompass any form of carbon dioxide used according to the present invention for cleaning crude tall oil soap. The cleaning carbon dioxide may thus comprise gaseous, fluid or solid carbon dioxide or it may comprise a carbon dioxide liberating fluid such as a mixture containing carbon dioxide gas dissolved in an aqueous solution of sodium bicarbonate and/or soap.

Figure 1:
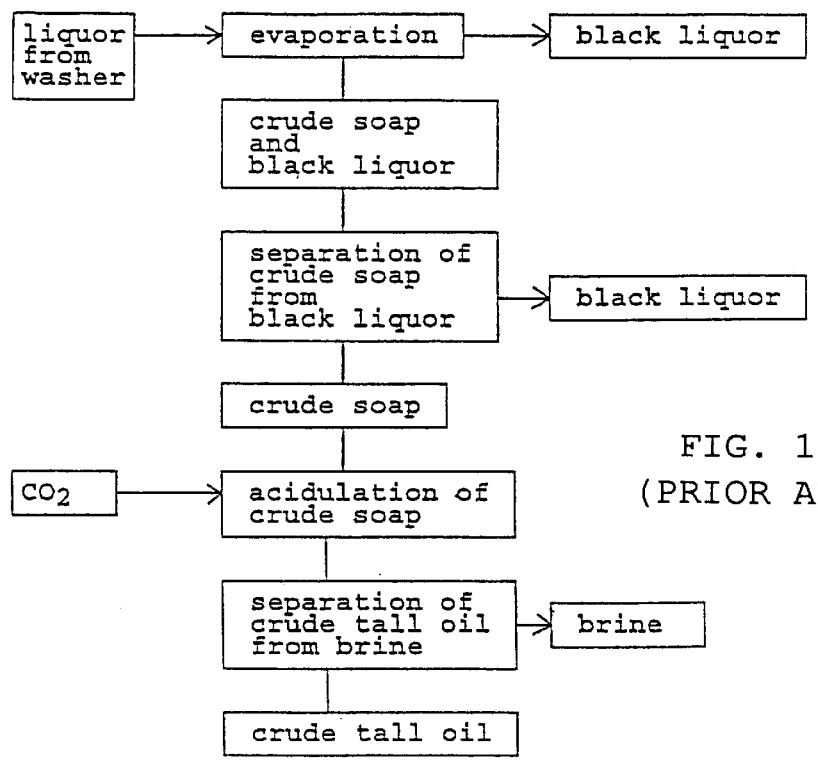
FIG. 1 is a block diagram of a tall oil recovery system according to the prior art.

The block diagram of FIG. 1 indicates a portion of a prior art pulping process, especially a kraft pulping process, substantially as described in U.S. Pat. No. 5,286,845 (Union Camp). The system generally includes a digester for cooking wood chips and a washer to separate the cooked pulp from the spent cooking liquor or black liquor. The separated black liquor includes tall oil in the form of soaps which gradually rise to the surface of the black liquor. In order to improve the separation of crude soap from black liquor and to increase the heat value of the black liquor for use as a fuel, the liquor from the washer is evaporated to a higher solids content. Crude soap fractions are recovered from the black liquor treatment vessels and combined. At this stage the crude soap will still contain a fair amount of black liquor.

The crude soap is conventionally separated from the remaining portion of black liquor in one or more soap treatment vessels or tanks. The separated black liquor is drained off and directed to a black liquor collecting line. In the prior art system the separated crude soap is fed from the crude soap tank to an acidulator where it is mixed with water and carbon dioxide at a high pressure to produce an emulsion. The carbon dioxide and water react with the tall oil sodium soaps to provide free oil and sodium bicarbonate according to the following equation:

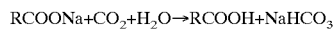

$$RCOONa+CO_2+H_2O \rightarrow RCOOH+NaHCO_3$$

The emulsion of tall oil and sodium bicarbonate brine is thereafter separated under pressure by allowing the phases to settle into two layers. The crude tall oil may be further acidulated with carbon dioxide or with sulfuric acid in the conventional way to liberate all of the tall oil.

Figure 2:
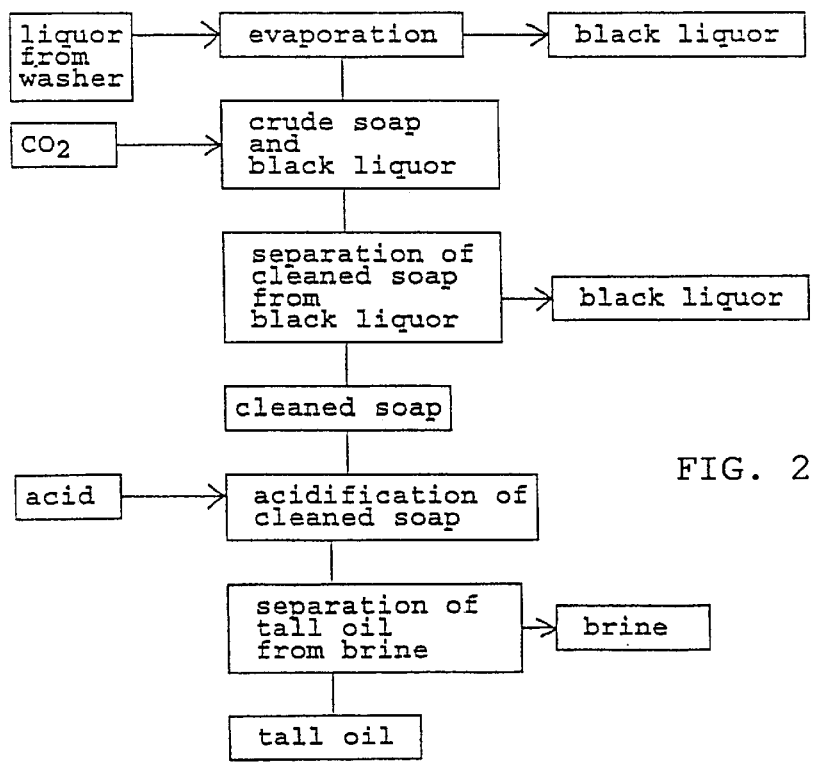
FIG. 2 is a block diagram of a tall oil recovery system according to the present invention.

The block diagram of FIG. 2 shows a tall oil recovery system according to the present invention. Like the prior art, the present system includes a washer and an arrangement for recovering black liquor and crude tall oil soap. In contrast to the prior art, the process according to FIG. 2 includes feeding of cleaning carbon dioxide to the system at a location upstream of the final separation of tall oil soap and black liquor. The cleaning carbon dioxide is fed below the liquid surface into any one of the vessels after the pulp washing stage up to the point where the tall oil soap is finally separated from the last portions of black liquor. The object of the carbon dioxide feed is to clean the soap and to cause impurities retained in the soap layer to leave the soap layer and move into the black liquor layer to be discharged therewith.

The cleaning carbon dioxide used according to the present invention is fed into a non-pressurized vessel. Such a vessel may be a storage or treatment tank or even a pipe between tanks. It may also comprise a separate cleaning reactor, although this is generally not necessary.

It is evident that feeding cleaning carbon dioxide to a vessel having a large volume of black liquor will require a large amount of carbon dioxide to provide the desired cleaning effect. For economical reasons, carbon dioxide gas is therefore preferably fed to a vessel close to the final separation of black liquor. However, if a sufficient amount of carbon dioxide is available the cleaning may advantageously be performed, for instance, in a weak black liquor tank.

In connection with the feed of cleaning carbon dioxide there may be fed a phase separation aid such as lignosulphonate compound or a sodium sulfite or bisulfite compound such as crude spent sulfite liquid.

After cleaning, the cleaned tall oil soap is collected in a tank for cleaned soap and the removed impurities will be discharged together with the black liquor. The cleaned soap may then be neutralized or acidulated with pressurized carbon dioxide and/or with sulfuric acid to provide free tall oil. As a result of the cleaning according to the present invention, however, less acidifying compounds will be needed. As a consequence of the cleaning, the separation of tall oil from the aqueous phase will also be quicker and more complete, leading to purer tall oil product than with the prior art processes. Moreover, the cleaning will also have the effect of removing viscous lignin compounds from the soap phase, which will result in less fouling of the soap treatment vessels and piping.

Figure 3:
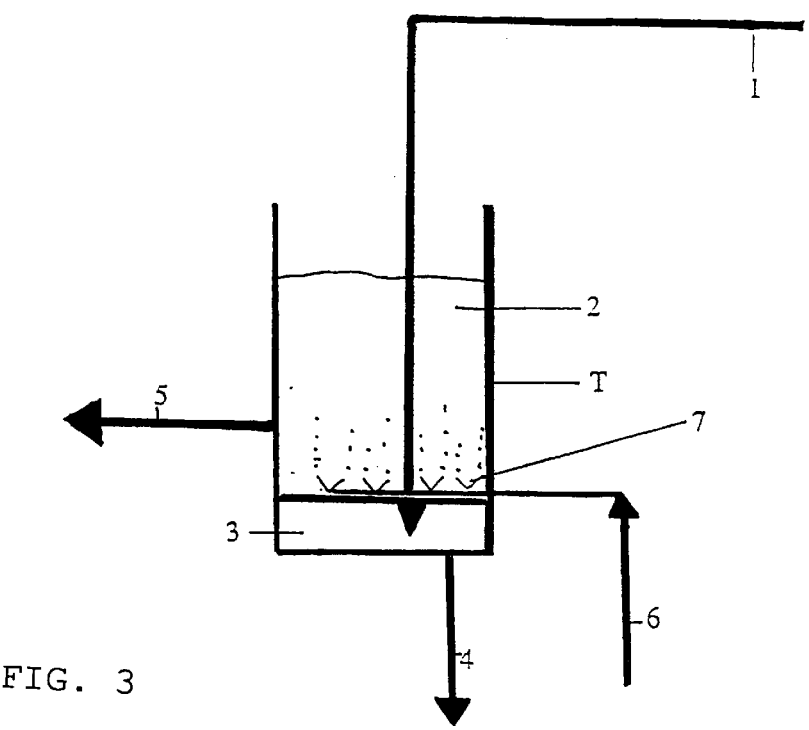
FIG. 3 is a schematic drawing of an apparatus for cleaning crude tall oil soap with carbon dioxide gas.

FIG. 3 shows a cleaning vessel T according to the present invention positioned somewhere in a tall oil recovery system in a kraft pulping process. Crude sulfate soap is separated from black liquor in said cleaning vessel T. The soap is fed into the vessel T via a pipe 1 and allowed to separate into a soap layer 2 on top and a black liquor layer 3 at the bottom. Black liquor is continuously or intermittently discharged from the bottom of the vessel T through a pipe 4 and directed to a black liquor collector line (not shown). Soap is continuously or intermittently fed to a further treatment step through a pipe 5.

The vessel T is provided with a sparger 7 for feeding cleaning carbon dioxide gas into the vessel T via a pipe 6. The sparger 7 is located in the lower portion of the vessel close to the boundary between soap and black liquor. The pressure in the vessel is at ambient pressure. The carbon dioxide is allowed to rise to the top of the soap and to react with compounds in the soap.

Although the discharge of carbon dioxide gas generally provides a sufficient mixing, a very gentle mechanical mixing may be provided to improve the contact between cleaning carbon dioxide and soap, but care should be taken not to mix separated black liquor back into the soap phase. The temperature in the tank is not critical and it may be between room temperature and about 100° C., generally between 40° C. and 80° C. Any carbon dioxide gas reaching the surface of the liquid is vented off or recycled.

Figure 4:
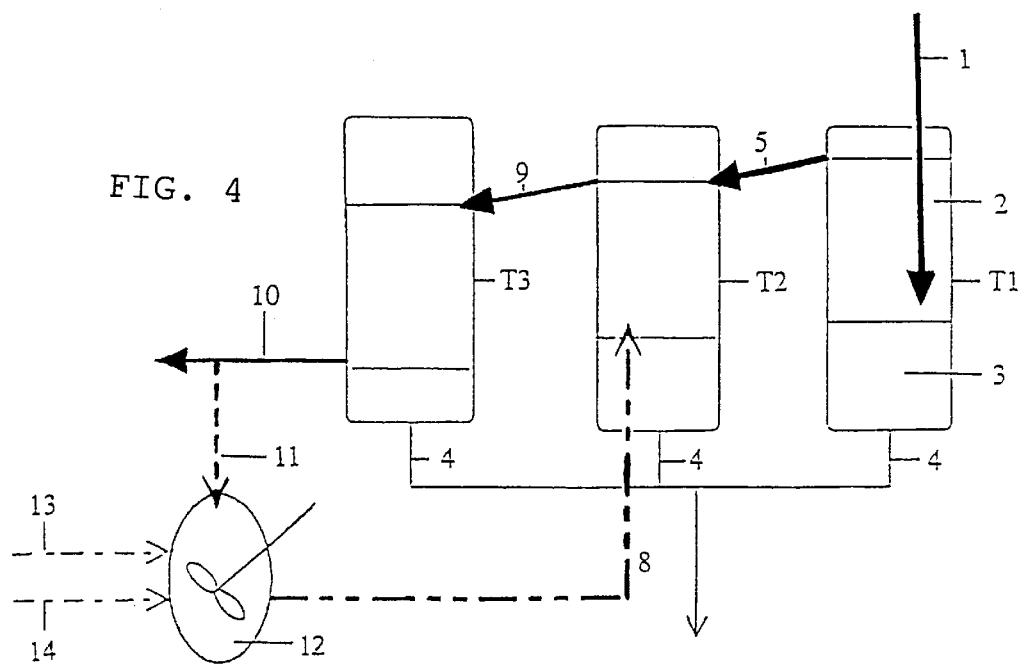
FIG. 4 is a schematic drawing of an apparatus for cleaning crude tall oil soap with a recirculating carbon dioxide liberating fluid.

FIG. 4 shows another carbon dioxide cleaning system for sulfate soap wherein features similar to the ones in FIG. 3 have been designated with the same reference numerals. In the embodiment of FIG. 4 crude sulfate soap is separated from the rests of black liquor in a series of three tanks, T1, T2 and T3. The soap is fed into the first tank T1 via a pipe 1 and allowed to separate into a soap layer and a black liquor layer. Separated soap is continuously or intermittently fed to the second tank T2 through a pipe 5.

The second tank T2 comprises a cleaning vessel according to the present invention and is provided with a pipe 8 for feeding carbon dioxide or a carbon dioxide liberating fluid into the soap layer.

Separated black liquor is discharged from the bottom of the tank T2 through a pipe 4 and the cleaned soap is allowed to overflow from the upper portion of the tank T2 through a pipe 9 to the third tank T3.

Although not shown in the present embodiment, the third tank T3 may preferably be provided with a carbon dioxide sparger similar to the one in FIG. 3 to facilitate the final removal of black liquor entrained in the cleaned soap. From Tank 3 the cleaned soap is fed through a pipe 10 to a clean soap storage tank or directly to acidulation. The separated black liquor is discharged from the bottom of the tank through a pipe 4 leading to a black liquor collector line.

The embodiment of FIG. 4 includes downstream of the cleaning tank T3 a branch 11 from the cleaned soap pipe 10. A portion of the cleaned soap is directed through branch pipe 11 to a reactor 12 where the cleaned soap is treated with carbon dioxide at ambient pressure or a higher pressure. Carbon dioxide at a suitable pressure is introduced through a pipe 13. The pressure in the reactor 12 is not critical and it is generally between 0 and 40 bar(g). The pressure may be higher, but is often limited by practical and economical aspects to about 2–15 bar(g). The temperature in the reactor is not critical and it may be above room temperature and below 100° C. and the temperature of the soap tank in question is generally preferred.

Water is preferably also fed into the reactor through a pipe 14. The amount of water is not critical although excess dilution should avoided so as not to add superfluous water to the system. A sufficient amount of water facilitates the dissolving of carbon dioxide gas into the reaction mixture.

In a special embodiment of the invention a phase separation aid such lignosulphonate or sodium sulfite or bisulfite is fed into the reactor 12 and/or into the cleaning tank T2.

The reaction is allowed to continue for about 2 to 20 minutes or more in the reactor, whereafter the whole reaction mixture is fed as such into the cleaning tank T2 through the pipe 8 and distributed into the soap layer. As the fluid enters the soap solution the pressure is released since the tank T2 is open to the atmosphere. Any pressurized carbon dioxide gas present in the fluid is liberated. Some carbon dioxide forms carbonic acid in the liquid and reacts with the components thereof.

As the brine is fed into the soap, impurities in the soap will be dissolved therein, Further, black liquor enclosed within the soap will easily combine with the brine at contact therewith. Since the brine is heavier than the soap and oil components, the aqueous brine sinks towards the black liquor and enters the black liquor layer together with dissolved impurities and black liquor collected from the soap layer.

From the cleaning tank T2 the cleaned soap flows over into settling tank T3, as described above. The cleaned soap is finally directed to a cleaned soap storage tank or directly to acidification or neutralization in any conventional way.

The process according to the invention may be performed as a batch process, with one or more cleaning vessels or it may be operated on a continuous basis.

The cleaning of the crude soap causes impurities such as lignin components in the soap to be removed with the black liquor. The result is that the apparatus is kept cleaner and the separation is quicker and more complete than without the cleaning step. As a consequence the soap fraction contains less black liquor and thus less acid is needed for the acidification of the soap to free the tall oil.

The cleaning process of the present invention may be built into most existing tall oil recovery systems and provides a technically simple and economic process for improving the soap recovery. The apparatus is technically uncomplicated and it has the advantage over most of the prior art processes that it may be operated at any level of cleaning, from the maximum cleaning obtainable with any specific apparatus to a minimum cleaning with no feed of cleaning carbon dioxide.

The invention will now be illustrated with the aid of a few non-limiting examples.

EXAMPLE 1

The apparatus of this Example was substantially as shown in FIG. 3 for bubbling of carbon dioxide gas into a cleaning tank. In addition to the process shown therein, a small amount of water was added to the soap batch in the tank. The cleaning was performed by feeding carbon dioxide gas into the mixture at an overpressure of less than 1 bar(g). A gentle mixing was performed from time to time in order to facilitate the contact between the gas and liquid.

The cleaning reaction was allowed to proceed for about 15 min. Thereafter the black liquor which had accumulated at the bottom of the tank was separated from the cleaned soap which had risen to the top. The cleaned soap was acidified with concentrated sulfuric acid to pH 3 in order to free the tall oil.

The results of the run are indicated in Table 1 below.

EXAMPLE 2

The apparatus of this Example was substantially as shown in FIG. 4 for feeding carbon dioxide in a mixture of brine and soap into a cleaning tank. A portion of soap was drawn off and mixed in a separate reactor with water in the ratio 1:1. The reactor was pressurized to about 3 bar(g) by feeding carbon dioxide gas into the soap-water mixture. The reaction time in the reactor was about 10 min.

The cleaned soap-brine mixture was fed back to the soap tank below the liquid surface and a fresh portion of soap was drawn off from the top of the soap layer and fed to the reactor. The carbon dioxide mixing in he reactor was repeated a few times, whereafter the cleaned soap and the aqueous black liquor were separated. The cleaned soap was acidified with sulfuric acid to produce tall oil (mother liquor at pH 3).

The results of the run are indicated in Table 1 below.

In order to evaluate the effect of the cleaning procedures, an equal amount of the same crude soap as in Examples 1 and 2 was acidified without any carbon dioxide cleaning. The soap samples were acidified directly with sulfuric acid to provide tall oil.

The results of the comparative test are indicated in Table 1.

TABLE 1

| Procedure | Soap g | Sulfuric acid, g | Tall oil g | Sulfuric acid saving % |
|---|---|---|---|---|
| Comparative | 1507 | 161 | 769 | ref |
| Ex 1 | 1530 | 122 | 796 | 27 |
| Ex 2 | 1523 | 114 | 807 | 32 |

The results of the tests show that cleaning the crude soap with carbon dioxide provided a saving of 25 to 35% of acidifying sulfuric acid. The saving varied slightly depending on the procedure used and the quality of the soap. The yield of tall oil increased slightly compared to the non-cleaned reference.

The tests also showed that the separation of the tall oil from the mother liquor after acidification was significantly faster for the cleaned soap than for the non-cleaned soap. Moreover, the lignin layer between the mother liquor and the tall oil after acidification was significantly thinner in the case of the cleaned soap compared to that of the non-cleaned soap. This indicates that a part of the lignin had been removed with the black liquor when the soap was cleaned.

The present invention has been described above with reference to a few specific embodiments. However, it will be evident to those skilled in the art that the inventive concept may be varied in many ways within the scope of the appended claims.

What is claimed is:

1. A process for the cleaning of crude tall oil soap prior to a final separation of said crude soap and black liquor, characterized in that crude tall oil soap floating on top of a layer of black liquor or a mixture of crude tall oil soap and black liquor is cleaned with carbon dioxide, whereafter the black liquor is discharged separately from the cleaned soap.

2. A process according to claim 1 wherein said carbon dioxide cleaning is performed prior to any actual acidulation of the tall oil soap.

3. A process according to claim 1 wherein said carbon dioxide is in the form of $CO_2$ gas at atmospheric pressure or a higher pressure.

4. A process according to claim 1 wherein at least a part of said carbon dioxide is provided by feeding a fluid capable of liberating carbon dioxide into said soap or black liquor or said mixture thereof.

5. A process according to claim 4 wherein said fluid capable of liberating carbon dioxide is a mixture including soap and bicarbonate brine.

6. A process according to claim 5 wherein said mixture of soap and brine is provided by recirculating a portion of said soap via a reactor, wherein said soap is mixed with carbon dioxide.

7. A process according to claim 6 wherein said reactor operates at atmospheric pressure or a higher pressure.

8. A process according to claim 6 wherein water is fed into said reactor.

9. A process according to claim 6, wherein a separation aid is fed into said reactor or into said crude soap layer or black liquor layer or said mixture thereof.

10. A process according to claim 9 wherein said separation aid is sodium bisulfite or lignosulphonate.

11. A process according to claim 6, wherein said mixture of soap and brine is oversaturated with respect to carbon dioxide.

12. A process according to claim 1 wherein carbon dioxide and/or a fluid capable of liberating carbon dioxide is fed into a layer of crude soap floating on top of a black liquor layer said carbon dioxide being distributed close to the boundary between soap and black liquor.

13. A process according to claim 1 wherein carbon dioxide and/or a fluid capable of liberating carbon dioxide is fed into a layer of black liquor below a layer of crude soap floating on top of said black liquor.

14. A process according to claim 1 wherein carbon dioxide and/or a fluid capable of liberating carbon dioxide is distributed at several locations into said layers or said mixture.

15. A process according to claim 1 wherein carbon dioxide and/or a fluid capable of liberating carbon dioxide is fed into one or more vessels containing crude tall oil soap and black liquor.

16. A process according to claim 1 wherein a separation aid is fed into one or more vessels containing crude tall oil soap and black liquor.

17. An apparatus for cleaning crude tall oil soap, characterized in that it comprises in a tall oil recovery system at least one cleaning vessel (T, T2) for crude tall oil soap and black liquor which cleaning vessel is provided with an inlet for carbon dioxide (6) and/or a carbon dioxide liberating fluid (8), said cleaning vessel (T, T2) or at least one vessel (T3) downstream thereof being provided with a black liquor outlet (4).

18. An apparatus according to claim 17 wherein said cleaning vessel (T) comprises any vessel in a tall oil recovery system which is prior to any actual acidulation vessel of said system.

19. An apparatus according to claim 17 wherein said cleaning vessel (T) comprises a skimming tank, a black liquor separation tank, a soap storage or retention tank, a soap washing tank, a pipe leading to or from such tanks, or the like vessel.

20. An apparatus according to claim 17 wherein said apparatus is provided with a reactor (12) for mixing soap and carbon dioxide at atmospheric pressure or a higher pressure said reactor (12) being provided with an inlet for soap (11), an inlet for carbon dioxide (13), and an outlet for said mixture of soap and carbon dioxide, said outlet being connected to said carbon dioxide liberating fluid inlet (8) in said cleaning vessel (T2).

21. An apparatus according to claim 20 wherein said reactor is provided with at least one inlet for a fluid (14) such as water or a separation aid.

22. An apparatus according to claim 20 wherein said soap inlet (11) is connected to a position in said tall oil recovery system which is down stream of said cleaning vessel (T2) to provide recirculation of a portion of separated soap to said cleaning vessel.

23. A process for the production of tall oil, comprising the steps of recovering black liquor and crude tall oil soap in a tall oil recovery system of a pulping process, cleaning said soap by introducing carbon dioxide and/or a carbon dioxide liberating compound into said soap or black liquor, separating black liquor from the cleaned soap, acidifying said cleaned soap in one or more stages, and recovering tall oil.

* * * * *